United States Patent Office 2,950,260
Patented Aug. 23, 1960

2,950,260

PROCESS OF ACTIVATING NICKEL-ALUMINUM CATALYSTS

Chester K. Rosenbaum and John C. Tallman, Wilmington, Del., assignors to E. I. du Pont de Nemours and Company, Wilmington, Del., a corporation of Delaware No Drawing. Filed Dec. 9, 1957, Ser. No. 701,322

7 Claims. (Cl. 252—466)

This invention relates to an improved process for the activation of granular nickel-aluminum alloy catalysts by treatment with aqueous alkali solutions for use in the hydrogenation of organic compounds.

Alloy catalysts containing nickel and aluminum have been used extensively in commercial processes, particularly for the hydrogenation of organic compounds. When employed for such purposes, these alloy catalysts are invariably activated prior to use, which activation may be carried out by subjecting the alloy to hydrogenation under elevated temperatures and pressures preferably in the presence of moisture, by hydrogenation followed by treatment with water, by solution treatment to dissolve out a portion or all of the aluminum, or by any other means whereby one of the constituents and, generally, the aluminum is wholly or partially removed prior to use.

Granular nickel-aluminum catalysts are of particular value as fixed bed catalysts for the continuous hydrogenation of organic compounds, such as benzene and furan which may be hydrogenated to cyclohexane and tetrahydrofuran respectively. Weber et al. U.S. Patent 2,391,283 (Dec. 18, 1945), have prepared catalysts of this type by treating alloy granules having a particle size in the range 1 to 14 mesh with aqueous caustic alkali, thereby removing a portion of the surface aluminum and leaving an active surface of foraminous nickel over an unchanged alloy core. The alloys employed for this purpose preferably contain about 40 to 60% nickel, the balance consisting principally of aluminum. The aluminum content of the alloy is reduced from 5 to 30% in the activation process. On use, the catalyst gradually loses its activity and may then be reactivated by a further reduction of its aluminum content. However, in some cases its has been found that the reactivated catalyst is not the equivalent of that first obtained, whereas in other cases reactivation is not possible. Stiles, U.S. Patent 2,491,694 (1949), points out that when the granular catalysts have been used for the hydrogenation of organic substances containing minute traces of sulfur compounds, as, for example, in the hydrogenation of benzene to cyclohexane, the deactivated catalyst is covered with a thin enamel-like coating which is completely impervious to alkali. While the nature of this coating is not fully understood, the evidence seems to indicate that it is a composition comprising nickel sulfide and aluminum oxide.

An examination of the prior art indicates that the reaction of aqueous alkali solutions with nickel-aluminum alloys results in conversion of aluminum to alkali aluminates, aluminum hydroxide and aluminum oxide. The following equations, for example, indicate the reactions which may take place in the presence of aqueous sodium hydroxide.

$$2NaOH + 2Al + 2H_2O = 2NaAlO_2 + 3H_2 \quad (1)$$

$$2Al + 6H_2O = 2Al(OH)_3 + 3H_2 \quad (2)$$

$$2Al(OH)_3 = Al_2O_3 + 3H_2O \quad (3)$$

In addition, aluminum hydroxide may also be formed by the hydrolysis of sodium aluminate.

$$NaAlO_2 + 2H_2O = Al(OH)_3 + NaOH$$

Raney, U.S. Patent 1,915,473 (June 27, 1933), recommends reaction of the alloy with sodium hydroxide in amount insufficient to convert all the aluminum to sodium aluminate and points out the rest of the aluminum would be largely converted to aluminum hydrate, $Al_2O_3 \cdot 3H_2O$ or $Al(OH)_3$. He states that the nickel-aluminum hydrate composition thus obtained is a voluminous catalytic material in which the aluminum hydrate contributes to its catalytic value. Considerable heat is evolved when aqueous alkali solutions are contacted with the nickel-aluminum alloy and the reaction mixture may reach or exceed the boiling point of the aqueous solution. The prior art methods of catalyst activation are, generally, those developed by Adkins and coworkers (Jour. American Chem. Soc. 54, 4116 (1932); 68, 1471 (1946); 69, 3039 (1947), and 70, 695 (1949)). These procedures all involve treating the nickel-aluminum alloy with aqueous solutions containing 15 to 20% sodium hydroxide at initial temperatures of 10° to 50° C. followed by heating to 100° C. or above until reaction is complete. Weber et al., U.S. Patent 2,391,283 (Dec. 18, 1945), use dilute sodium hydroxide, but preheat it to 90° to 100° C. before pumping it over the nickel-aluminum alloy granules in their activation process.

In the process of the present invention described hereinafter it is believed that the control factors imposed limit the reaction to the formation of the alkali aluminate, which is water-soluble, and that unsatisfactory granular catalysts are formed whenever aluminum hydroxide or aluminum oxide is precipitated in the reaction mixture. It was found that reaction mixtures were always free of turbidity when the new process was employed. Although the above points to a possible explanation of the results obtained, the interpretation is by no means certain in view of the prior art and the invention is not to be bound by it.

An object of this invention is to provide an improved process for the activation of granular nickel-aluminum alloy catalysts by treatment with aqueous alkali. An additional objective is to provide a more effective process for the reactivation of granular nickel-aluminum alloy catalysts that have lost their activity through use. A still further objective is to provide granular, activated nickel-aluminum alloy hydrogenation catalysts of improved activity and working life. Yet another objective is to provide granular, activated nickel-aluminum alloy catalysts which can be readily reactivated by an additional treatment with aqueous alkali after they have lost their activity through use. Other objectives will appear hereinafter.

These objectives are accomplished by treating a granular nickel-aluminum alloy catalyst with a dilute aqueous solution of alkali, preferably sodium hydroxide or potassium hydroxide, at a temperature of 35° C. or below while controlling the contact time so that not more than about 1.5 molecular proportions of hydrogen are evolved for each molecular equivalent of alkali. The preferred activation process of this invention is carried out by passing a cool aqueous solution of 0.5 to 5% by weight sodium or potassium hydroxide over a bed of the initially dry alloy catalyst at such a rate that the exit temperature of the solution is never greater than 35° C. and the hydrogen evolution does not exceed the rate of 1.5 moles of hydrogen per mole of the alkali hydroxide.

When not otherwise specified, the term activation as employed in connection with the granular nickel-aluminum alloy catalysts in this invention is defined as referring both to the initial activation of the fresh alloy particles and the reactivation thereof when they have lost their activity through use.

The advantages of this improved activation process are that the activated nickel-aluminum alloy catalysts not only give a substantially quantitative yield of hydrogenation product, but allow increased hydrogenation rates and maintain these characteristics on use for a much longer period than catalysts activated by the procedures of the prior art. The increased hydrogenation rates allow a higher output per unit of time from a given reactor thus improving plant capacity. The average working life of the catalyst in a hydrogenation process has also been approximately doubled or better in most instances. In addition, the activation process is more rapid and less aluminum need be dissolved from the alloy to produce optimum results. The improved process is also advantageous in that it gives a catalyst which is readily reactivated after it has lost its initial activity on prolonged use even when employed for hydrogenation of organic compounds contaminated with minute traces of sulfur compounds.

As previously indicated, the most critical features of the activation process of this invention are: (1) the activation temperature which must be at or below 35° C. and (2) the controlled evolution of hydrogen which must not exceed more than about 1.5 molecular proportions per equivalent of caustic alkali. Preferably, the rate of hydrogen evolution should be less than 1.5 molecular proportions per equivalent of alkali passed over the catalyst although it may be about this value for short intervals. This stipulation insures the presence of some free caustic in the aqueous solution leaving the catalyst. An alternate method of insuring this condition is by carrying out the process so that the pH of the exit solution is never less than about 12. However, this method is regarded as less dependable than the measurement of hydrogen evolution.

These factors may be controlled by using a dilute caustic solution, precooling the caustic solution to any temperature short of freezing, cooling the convertor or catalyst container, using a sufficient volume of caustic solution to preclude excessive temperatures and passing the solution over the catalyst at a rapid rate of flow. These or other suitable means obvious to one skilled in the art may be used as necessary to insure maintenance of the aforesaid factors.

Nickel-aluminum alloys containing 35 to 60% nickel may be used for the production of the granular alloy catalysts of this invention. However, alloys having a nickel content of 38 to 48% are preferred. It should be specially noted that alloys containing about 50% nickel are least desirable since, on activation, these have a unique tendency to give a brittle layer of foraminous nickel which spalls readily and shows poor adherence to the parent granule.

Catalyst grain sizes in the range 1 to 14 mesh may be used and the term granular catalyst as used hereinafter will define a catalyst consisting of particles whose size falls within these limits. However, grain sizes in the range 2 to 6 mesh are preferred for use in the process of this invention.

Approximately 95% of the catalyst should pass through a No. 2 screen having 0.500 inch openings and be retained on a No. 6 screen having 0.132 inch openings.

According to the prior art, granular catalysts are activated by removal of 5 to 30% and preferably 20 to 25% by weight of their aluminum content. However, in the process of this invention it is generally preferable to remove only about 10% of the aluminum in the initial activation of fresh alloy granules and only about 5% of the residual aluminum in subsequent activations. Since a more active catalyst is obtained, less aluminum need be removed in the activation process. This makes it possible to secure a longer term use for each batch of catalyst and decreases the catalyst cost per pound of hydrogenated product. If the catalyst is overactivated by dissolving larger percentages of aluminum, the active layer of foraminous nickel may flake off and plug the supporting screens of the catalyst bed or alternately break up into small particles which may be carried off in the hydrogenated product. The amount of aluminum removed is best determined by measuring the amount of hydrogen evolved in the treating process. Furthermore, this can be done in conjunction with maintaining the critical control feature which relates hydrogen evolution to the amount of caustic employed in the activation process. For each atom of aluminum removed, 1.5 molecules of hydrogen are generated.

Since previously unactivated nickel-aluminum alloy granules react most violently with aqueous alkalis, particular care must be exercised in controlling an initial activation. Sodium hydroxide rather than potassium hydroxide is usually employed for this process because it is the less costly and more readily available of the two alkalis. For this purpose aqueous solution containing 0.5 to 2.0% sodium hydroxide and precooled to 10°–15° C. may be pumped through the catalyst container at a rate of about one gallon per minute per cubic foot of catalyst. Under these conditions, the solution exit temperature will normally be less than 35° C. and the hydrogen evolution will not exceed the critical limit. On the first reactivation of a used catalyst, other conditions being the same, the caustic concentration can be raised to 2 to 4% and the initial solution temperature may be as high as about 25° C. Additional reactivations may then be carried out with 4 to 7% sodium hydroxide and still higher initial temperatures. Even temperatures of 40° to 60° C. are tolerable in further activations provided the initial activations have been carried out according to the process of this invention.

The invention is further illustrated by the following example.

*Example*

Two comparative catalyst activations were carried out with approximately 16 lb. samples of granular nickel-aluminum alloy containing approximately 42% nickel and 58% aluminum by weight and having a grain size in the range 2¼ to 6 mesh. In each case, the alloy sample was placed on a supporting screen in a 3 inch diameter insulatated steel reactor tube so that a catalyst bed having a height of 35″ was obtained. The catalyst volume was about 3920 ml. or 0.14 cu. ft. The caustic activations were continued in each case until 10% by weight of the aluminum content of the catalyst sample had been dissolved as indicated by the quantity of hydrogen evolved. Aqueous caustic flow rates were about 500 ml. per minute which is equivalent to about 1 gal. per minute per cubic foot of catalyst.

In test No. 1, the catalyst was activated by up-flow passage of about 500 ml. per minute 0.5% aqueous sodium hydroxide cooled to a temperature ranging from 17.5° to 20.5° C. The effluent alkali temperature remained at 32° C. throughout the test and the activation was complete in 5 hours. The hydrogen evolution rate reached approximately 1.6 moles per mole of sodium hydroxide feed for a few minutes at the start of the activation process and then dropped rapidly. The caustic effluent was crystal clear throughout the process.

In test No. 2, the catalyst tube was equipped with a combination feed, exit and up-flow recycle system. In this case the system was first filled with water adjusted to 40° C. and set at a recycle flow of 400 ml. per minute. A feed of 127–8 ml. per minute of 0.5% aqueous sodium hydroxide was then established with a total flow of about 527–8 ml. per minute. The feed temperature was maintained at 35°–40° C. Within a short time, the effluent caustic became cloudy with a white precipitate which gradually cleared up after 3 hours. However, even after this, the clear effluent became cloudy on cooling to 25° C. The rate of hydrogen evolution was equivalent to 2.4 moles per mole of sodium hydroxide charged at the start, but gradually decreased. After 5 hours, the caustic feed concentration was raised to 1% to increase the activation rate, but activation was only 50% complete after 11 hours, and further treatment with 2% caustic was needed to complete activation. The activation required a total of 15.5 hours.

Catalysts from tests 1 and 2 were washed with water after activation to remove residual caustic and then dried by washing with tetrahydrofuran. The catalysts were then evaluated for furan hydrogenation in the insulated tubes in which they were activated. An approximately 6% by weight solution of furan in tetrahydrofuran and excess hydrogen at a pressure of 500 p.s.i.g. were fed into the catalyst at an initial temperature of 90° C. Identical feed mixtures and reaction conditions were used in each experiment. Furan conversions were determined and temperatures were measured at various levels in the catalyst bed.

The catalyst from test 1 showed a 100% conversion after 4 hours use, whereas the catalyst from test 2 showed an 88% conversion after 4 hours. The high activity of test 1 catalyst was demonstrated in the fact that the reaction temperature rose rapidly in the bed reaching a value of 119° C. after traversing 50% of the total catalyst and then gradually dropped to an exit temperature of 116° C. This indicates complete reaction of hydrogen and furan at the mid-point of their passage through the catalyst bed. The catalyst activated in test 2 showed a rise in temperature to only 105° C. at the mid-point of the bed followed by a slight rise thereafter. This indicates that the hydrogenation reaction is still progressing and is still incomplete when the reactants leave the catalyst.

Conversion figures and yields thus demonstrate the superiority of the catalyst activated by the process of this invention in test 1. The simplicity and rapidity of the activation technique also demonstrate the practical utility of the new process. The 5 hour activation time for test 1 represents an important saving of time as compared with the 15.5 hour activation for test 2 which also involved raising the concentration of the caustic treating solution. The efficiency of the new activation process alone represents a definite economic advantage.

Although various methods for carrying out the invention have been discussed, it will be evident that many other modifications are possible. The foregoing example is submitted solely for illustration and the invention is not to be limited thereby. Equivalent results are obtained when the catalyst is employed in other hydrogenation reactions, for example, the hydrogenation of benzene to cyclohexane. Aqueous sodium hydroxide or potassium hydroxide are the preferred activating agents, but other alkalis may be used such as potassium carbonate or sodium carbonate. Solutions should preferably be made with distilled water, but any reasonably pure water supply is satisfactory, provided it is not contaminated with materials known to be catalyst poisons such as hydrogen sulfide. Small concentrations of chlorides, sulfates, etc. of alkali and alkaline earth metals as present in many city waters do no appreciable harm and may be employed in the catalyst preparation. After activation, the catalyst may be dried and used directly or subjected to a preliminary wash with water or a non-aqueous water-miscible solvent, such as methanol or tetrahydrofuran, with or without a preliminary water wash.

We claim:

1. The process for activating granular nickel-aluminum alloy catalyst containing 35 to 60% nickel, the balance consisting principally of aluminum, by reducing its aluminum content from 5 to 30% comprising treating the said alloy with a dilute aqueous solution of an alkali selected from the group consisting of sodium hydroxide and potassium hydroxide at temperatures not exceeding 35° C. while controlling the contact time so that not more than about 1.5 molecular proportions of hydrogen are evolved per mole of alkali in the contacting solution.

2. The process of activating granular nickel-aluminum alloy catalyst prepared from an alloy containing 38 to 48% nickel, the balance consisting principally of aluminum, comprising treating the said alloy with a dilute aqueous solution of an alkali selected from the group consisting of sodium hydroxide and potassium hydroxide at temperatures not exceeding 35° C. while controlling the contact time so that not more than about 1.5 molecular proportions of hydrogen are evolved per mole of sodium hydroxide in the contacting solution.

3. The method of activating granular nickel-aluminum alloy catalyst prepared from an alloy containing 38 to 48% nickel, the balance consisting principally of aluminum, and having a grain size in the range 2 to 6 mesh by the process comprising passing a 0.5 to 5.0% solution of sodium hydroxide over the said catalyst while cooling said solution so that the effluent solution never exceeds a temperature of 35° C. and while controlling the contact time so that the rate of hydrogen evolution never exceeds more than about 1.5 molecular proportions per mole sodium hydroxide until about 5 to 10% by weight of the aluminum content of the said alloy catalyst has been dissolved.

4. The process of claim 3 in which the granular nickel-aluminum alloy catalyst has not been previously activated and about 10% by weight of its aluminum content is dissolved.

5. The process of claim 3 in which the granular nickel-aluminum catalyst has been previously activated but has lost its activity through use and about 5% by weight of its aluminum content is dissolved to reactivate the catalyst.

6. A granular nickel-aluminum alloy hydrogenation catalyst characterized by a high degree of activity, a long working life and the property of being readily reactivated by treatment with aqueous solutions of an alkali selected from the group consisting of sodium hydroxide and potassium hydroxide, said catalyst being produced by treating a granular nickel-aluminum alloy containing 35 to 60% nickel, the balance consisting principally of aluminum with a dilute aqueous solution of an alkali at a temperature not exceeding 35° C. while controlling the contact time so that not more than about 1.5 molecular proportions of hydrogen are evolved per mole of alkali in the contacting solution and the aluminum content of the alloy is reduced from 5 to 30%.

7. A granular nickel-aluminum alloy hydrogenation catalyst characterized by a high degree of activity, a long working life and the property of being readily reactivated by treatment with aqueous solutions of an alkali selected from the group consisting of sodium hydroxide and potassium hydroxide, said catalyst being produced by treating a granular nickel-aluminum alloy containing 38 to 48% nickel, the balance consisting principally of aluminum and having a grain size in the range 2 to 6 mesh with a 0.5 to 5.0% aqueous solution of an alkali selected from the group consisting of sodium hydroxide and potassium hydroxide at a temperature not exceeding 35° C. while controlling the contact time so that not more than about 1.5 molecular proportions of hydrogen are evolved per mole of alkali in the contacting solution and the aluminum content of the alloy is reduced from 5 to 10%.

References Cited in the file of this patent

UNITED STATES PATENTS 2,604,455     Reynolds et al. _____ July 22, 1952